United States Patent
Ganapathy et al.

(10) Patent No.: US 12,068,913 B2
(45) Date of Patent: Aug. 20, 2024

(54) USING CLIENT DEVICE TO OPTIMIZE WIRELESS DRIVER RESTARTS IN ROUTER ON CHANGING NETWORK CONFIGURATION SETTINGS

(71) Applicant: ARRIS Enterprises LLC, Suwanee, GA (US)

(72) Inventors: Jalagandeswari Ganapathy, Bangalore (IN); Muralidharan Narayanan, Bangalore (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/391,414

(22) Filed: Aug. 2, 2021

(65) Prior Publication Data
US 2022/0038337 A1 Feb. 3, 2022

(30) Foreign Application Priority Data
Aug. 3, 2020 (IN) .............................. 202041033272

(51) Int. Cl.
*H04L 41/0813* (2022.01)
*H04W 84/12* (2009.01)

(52) U.S. Cl.
CPC ......... *H04L 41/0813* (2013.01); *H04W 84/12* (2013.01)

(58) Field of Classification Search
CPC .................................................. H04L 41/0813
USPC ....................................................... 370/254
See application file for complete search history.

(56) References Cited

U.S. PATENT DOCUMENTS

| | | |
|---|---|---|
| 9,516,700 B1 | 12/2016 | Rybak et al. |
| 2005/0262101 A1 | 11/2005 | Halpern et al. |
| 2012/0157099 A1* | 6/2012 | Matsumoto ....... H04W 52/0206 455/435.1 |
| 2017/0366956 A1* | 12/2017 | Yoshida ................ H04W 8/005 |
| 2019/0020541 A1* | 1/2019 | Peng ........................ H04L 67/02 |
| 2019/0253573 A1 | 8/2019 | Nakayama |
| 2019/0260577 A1* | 8/2019 | Ren ....................... H04L 9/0816 |

FOREIGN PATENT DOCUMENTS

CN 110012465 A * 7/2019 ......... H04L 63/0807

OTHER PUBLICATIONS

International Search Report issued Nov. 4, 2021 in International (PCT) Application No. PCT/US2021/044146.
Written Opinion of the International Searching Authority issued Nov. 4, 2021 in International (PCT) Application No. PCT/US2021/044146.

* cited by examiner

*Primary Examiner* — Sibte H Bukhari
(74) *Attorney, Agent, or Firm* — Wenderoth, Lind & Ponack, L.L.P.

(57) ABSTRACT

A client device for use with a router having a radio, a first configurable feature, and a second configurable feature, the client device comprising: a memory; and a processor configured to execute instructions stored on the memory to cause the client device to: generate a first instruction to configure the first configurable feature; generate a second instruction to configure the second configurable feature; and transmit a queued-configuration signal, including the first instruction and the second instruction, to the router so as to reconfigure the first configurable feature, reconfigure the second reconfigurable feature, and turn off and restart the radio.

18 Claims, 5 Drawing Sheets

USING CLIENT DEVICE TO OPTIMIZE WIRELESS DRIVER RESTARTS IN ROUTER ON CHANGING NETWORK CONFIGURATION SETTINGS

BACKGROUND

Embodiments of the invention relate to Wi-Fi driver restarts when changing network configuration settings.

SUMMARY

Aspects of the present disclosure are drawn to a client device for use with a router having a radio, a first configurable feature, and a second configurable feature, with the client device including: a memory; and a processor configured to execute instructions stored on the memory to cause the client device to: generate a first instruction to configure the first configurable feature; generate a second instruction to configure the second configurable feature; and transmit a queued-configuration signal, including the first instruction and the second instruction, to the router so as to reconfigure the first configurable feature, reconfigure the second reconfigurable feature, and turn off and restart the radio.

In some embodiments, the router additionally has a third configurable feature, and the processor is configured to execute instructions stored on the memory to cause the client device further to: start a timer; and generate a third instruction to configure the third configurable feature.

In some further embodiments, the processor is configured to execute instructions stored on the memory to cause the client device further to: start the timer based on the generation of the first instruction; restart the timer based on the generation of the second instruction; and transmit the queued-configuration signal so as to further include the third instruction when the third instruction is generated prior to expiration of the restarted timer.

In some further embodiments, the router additionally has a second radio and the processor is configured to execute instructions stored on the memory to cause the client device further to transmit the queued-configuration signal to the router so as to additionally turn off and restart the second radio.

In some further embodiments, the processor is configured to execute instructions stored on the memory to cause the client device further to transmit the queued-configuration signal to the router so as to turn off and restart the radio a single time after reconfiguring the first configurable feature and reconfiguring the second reconfigurable feature.

In some further embodiments, the processor is configured to execute instructions stored on the memory to cause the client device further to: select an event that includes a first change to a first configuration and a second change to a second configuration; and generate the first instruction and generate the second instruction based on the selection of the event.

Other aspects of the present disclosure are drawn to a method of using a client device with a router having a radio, a first configurable feature, and a second configurable feature, with the method including: generating, via a processor configured to execute instructions stored on a memory, a first instruction to configure the first configurable feature; generating, via the processor, a second instruction to configure the second configurable feature; and transmitting, via the processor, a queued-configuration signal, including the first instruction and the second instruction, to the router so as to reconfigure the first configurable feature, reconfigure the second reconfigurable feature, and turn off and restart the radio.

In some embodiments, the method further includes: starting, via the processor, a timer; and generating, via the processor, a third instruction, wherein the router additionally has a third configurable feature, and wherein the third instruction includes an instruction to configure the third configurable feature.

In some further embodiments, the method further includes: restarting the timer, wherein starting the timer includes starting the timer based on the generation of the first instruction, wherein restarting the timer includes restarting the timer based on the generation of the second instruction, and wherein transmitting the queued-configuration signal includes transmitting the queued-configuration signal so as to further include the third instruction when the third instruction is generated prior to expiration of the restarted timer.

In some further embodiments, the router additionally has a second radio, and the transmitting includes transmitting, via the processor, the queued-configuration signal so as to additionally turn off and restart the second radio.

In some further embodiments, the transmitting includes transmitting, via the processor, the queued-configuration signal so as to turn off and restart the radio a single time after reconfiguring the first configurable feature and reconfiguring the second reconfigurable feature.

In some further embodiments, the method further includes: selecting, via the processor, an event that includes a first change to a first configuration and a second change to a second configuration, wherein the generating the first instruction and the generating the second instruction is based on the selection of the event.

Other aspects of the present disclosure are drawn to a non-transitory, computer-readable media having computer-readable instructions stored thereon, the computer-readable instructions being capable of being read by a client device with a router having a radio, a first configurable feature, and a second configurable feature, wherein the computer-readable instructions are capable of instructing the client device to perform the method including: generating, via a processor configured to execute instructions stored on a memory, a first instruction to configure the first configurable feature; generating, via the processor, a second instruction to configure the second configurable feature; and transmitting, via the processor, a queued-configuration signal, including the first instruction and the second instruction, to the router so as to reconfigure the first configurable feature, reconfigure the second reconfigurable feature, and turn off and restart the radio.

In some embodiments, the computer-readable instructions capable of instructing the client device to perform the method further includes: starting, via the processor, a timer; and generating, via the processor, a third instruction, wherein the router additionally has a third configurable feature, and wherein the third instruction includes an instruction to configure the third configurable feature.

In some further embodiments, the computer-readable instructions are capable of instructing the client device to perform the method further including: restarting the timer, wherein starting the timer includes starting the timer based on the generation of the first instruction, wherein restarting the timer includes restarting the timer based on the generation of the second instruction, and wherein transmitting the queued-configuration signal includes transmitting the queued-configuration signal so as to further include the third instruction when the third instruction is generated prior to expiration of the restarted timer.

In some further embodiments, wherein the router additionally has a second radio, and the computer-readable instructions are capable of instructing the client device to perform the method such that the transmitting includes transmitting, via the processor, the queued-configuration signal so as to additionally turn off and restart the second radio.

In some further embodiments, the computer-readable instructions are capable of instructing the client device to perform the method, wherein the transmitting includes transmitting, via the processor, the queued-configuration signal so as to turn off and restart the radio a single time after reconfiguring the first configurable feature and reconfiguring the second reconfigurable feature.

In some further embodiments, the computer-readable instructions are capable of instructing the client device to perform the method to further include: selecting, via the processor, an event that includes a first change to a first configuration and a second change to a second configuration, wherein the generating the first instruction and the generating the second instruction is based on the selection of the event.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

When changing network configuration settings, the Wi-Fi driver must be restarted to make these changes. Wi-Fi drivers are software programs designed to run and configure routers. This can be troublesome to users when they would like to make multiple network configuration changes. In some routers having three distinct radios, e.g., a 2.4 GHz band radio, a low 5 GHz band radio, and a high 5 GHz band radio, these changes will restart the Wi-Fi driver for each radio. This creates a poor user experience, as they will have repeated wireless network interruptions.

What is needed is a system and method for optimizing Wi-Fi driver restarts when changing network configuration settings.

A system and method in accordance with the present disclosure optimizes Wi-Fi driver restarts when changing network configuration settings.

In accordance with the present disclosure, when the router has changes made to its network configuration settings, it may not immediately restart. Instead, the router may wait a short period of time to restart the Wi-Fi drivers after applying these network configuration settings. A client device may instruct the router to minimize the number of Wi-Fi driver restarts by the router. The client device may queue the network configuration setting requests, and send all of these requests at one time. This allows for a single Wi-Fi driver restart, as opposed to restarting the Wi-Fi driver every time the user makes a change to a single network configuration setting. The client device may queue the network configuration requests in two ways: screen event-based queuing and background flow-event queuing. Screen event-based queuing may continue to restart the Wi-Fi driver restart timer so long as the user is inputting new requests into the client device. When the user stops making network configuration changes, the queued network configuration requests are sent to the router in sequential order. The router may make these changes, and then initiate the Wi-Fi driver restart. Background flow-event queuing may send essential background steps to the router without the user's knowledge. The client device may determine these background configuration settings, arrange them in such a way that the flow of the user's changes is unaffected, and then send those requests to the router in a sequential manner to optimize the Wi-Fi driver restart.

An example system and method for optimizing Wi-Fi driver restarts in routers when changing network configuration settings in accordance with aspects of the present disclosure will now be described in greater detail with reference to FIGS. 1-4.

Figure 1:
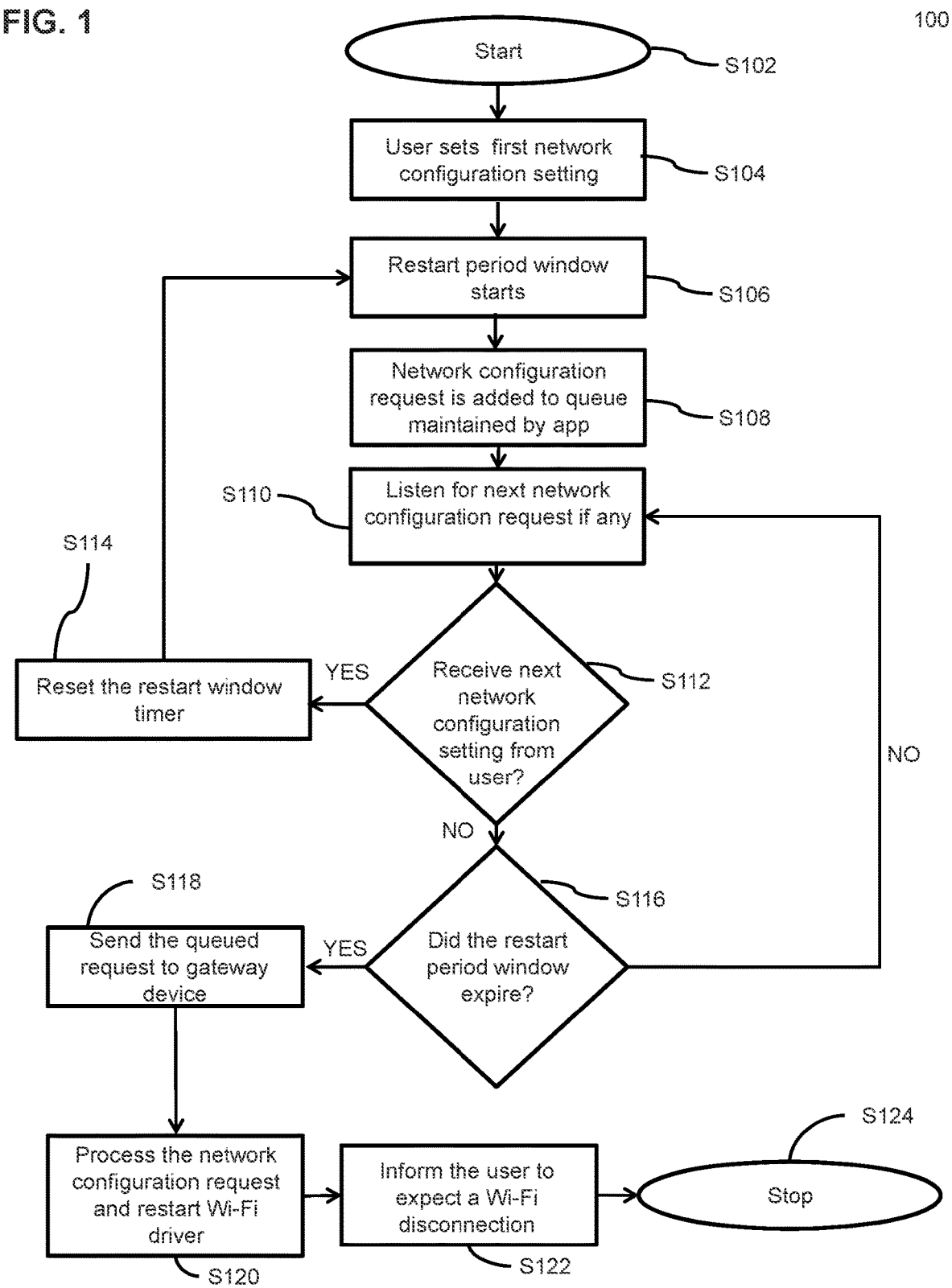
FIG. 1 illustrates an algorithm for a screen event-based network configuration settings queuing system.

FIG. 1 illustrates an algorithm 100 for optimizing Wi-Fi driver restarts when changing network configuration settings.

When a network configuration setting is changed, the router will be restarted. This causes all clients associated with the router to be disconnected from the wireless network for a period of time while the router is restarting.

As shown in FIG. 1, algorithm 100 starts (S102), and the user sets first network configuration setting (S104). This will be described in greater detail with reference to FIG. 2.

Figure 2:
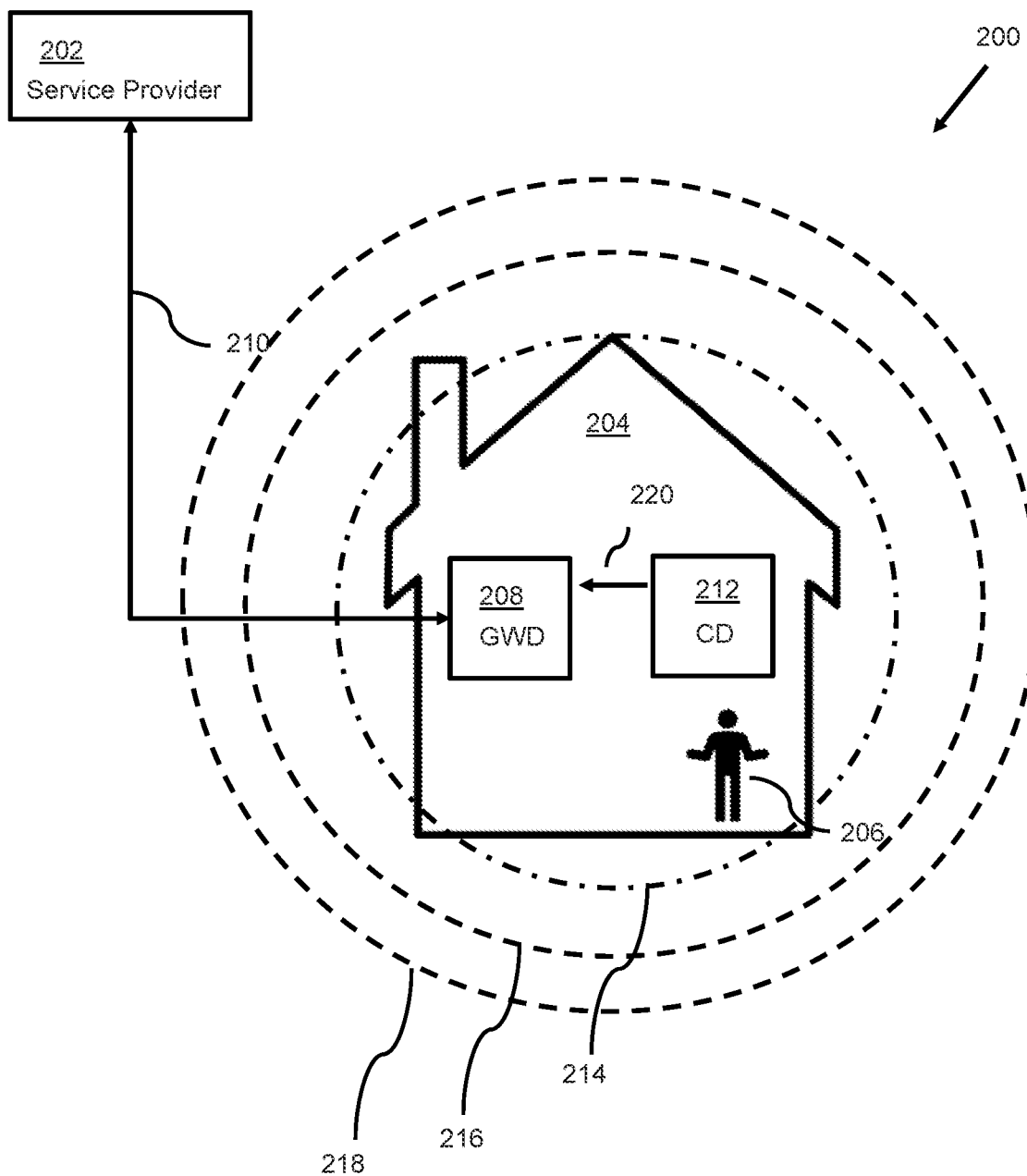
FIG. 2 illustrates a wireless network.

FIG. 2 illustrates a wireless network 200.

As shown in the figure, wireless network 200 includes a service provider 202, a residence 204, a resident 206, a gateway device 208, physical media/wiring 210, a client device 212, area 214, 216, and 218, and a queued-configuration signal 220.

Area 214, 216, and 218 all represent the area that the respective Wi-Fi band is broadcasting in. Area 214 represents the 5 GHz high band, area 216 represents the 5 GHz low band, and area 218 represents the 2.4 GHz band.

Returning to FIG. 1, for purposes of the discussion, consider the situation wherein resident 206 changes a network configuration setting of gateway device 208 by way of client device 212. For purposes of the discussion, in this example, let gateway device 208 provide gateway operations as well as router operations. This will be described in greater detail with reference to FIG. 3.

Figure 3:
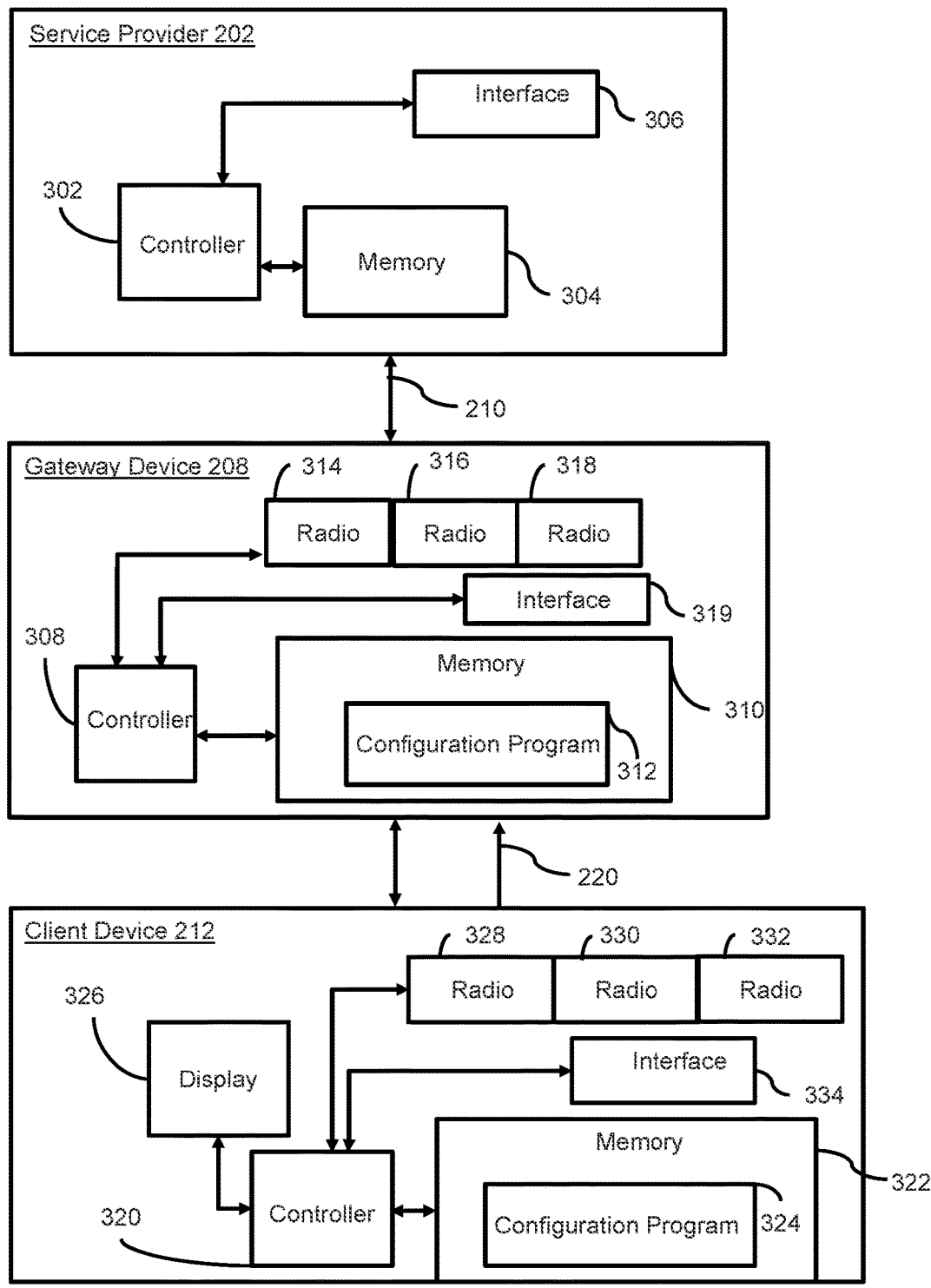
FIG. 3 illustrates an exploded view of a service provider, a gateway device, and a client device.

FIG. 3 illustrates an exploded view of service provider 202, gateway device 208, and client device 212.

As shown in the figure, service provider 202 includes controller 302, memory 304, and interface circuit 306.

Controller 302 may be a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 208 in accordance with the embodiments described in the present disclosure.

Memory 304 can store various programming, and user content, and data.

Interface circuit 306 can include one or more connectors, such as RF connectors, or Ethernet connectors, and/or wireless communication circuitry, such as 5G circuitry and one or more antennas.

Gateway device 208 includes controller 308, memory 310, which has stored therein configuration program 312, radio 314, radio 316, radio 318 and interface 319.

In this example, controller 308, memory 310, radio 314, radio 316, radio 318 and interface 319 are illustrated as individual devices. However, in some embodiments, at least two of controller 308, memory 310, radio 314, radio 316, radio 318 and interface 319 may be combined as a unitary device. Whether as individual devices or as combined devices, controller 308, memory 310, radio 314, radio 316, radio 318 and interface 319 may be implemented as any combination of an apparatus, a system and an integrated circuit. Further, in some embodiments, at least one of controller 308 and memory 310 may be implemented as a computer having non-transitory computer-readable media for carrying or having computer-executable instructions or data structures stored thereon. Such non-transitory computer-readable recording medium refers to any computer program product, apparatus, or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk, and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to, the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 308 may be a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 208 in accordance with the embodiments described in the present disclosure.

Memory 310 can store various programming, and user content, and data, including configuration program 312.

Configuration program 312 contains instructions that when executed by controller 308, enable controller 308 to configure gateway device 208.

Radio 314, radio 316 and radio 318 may also be referred to as a wireless communication circuit, such as a Wi-Fi WLAN interface radio transceiver, and is operable to communicate with client device 212. Radio 314, radio 316 and radio 318 include one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Gateway device 208 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Interface circuit 319 can include one or more connectors, such as RF connectors, or Ethernet connectors, and/or wireless communication circuitry, such as 5G circuitry and one or more antennas.

Client device 212 includes a controller 320, a memory 322, which has stored therein configuration program 324, display 326, radio 328, radio 330, radio 332, and interface circuit 334.

In this example, controller 320, main memory 322, radio 328, radio 330, radio 332, and interface 334 are illustrated as individual devices. However, in some embodiments, at least two of controller 320, main memory 322, radio 328, radio 330, radio 332, and interface circuit 334 may be combined as a unitary device. Further, in some embodiments, at least one of controller 320 and main memory 322 may be implemented as a computer having tangible computer-readable media for carrying or having computer-executable instructions or data structures stored thereon.

Controller 320, may be a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 212 in accordance with the embodiments described in the present disclosure.

Memory 322 can store various programming, and user content, and data including configuration program 324. In some embodiments, as will be described in greater detail below, configuration program 324 includes instructions, that when executed by controller 320, enable client device 212 to generate a first instruction to configure the first configurable feature; generate a second instruction to configure the second configurable feature; and transmit a queued-configuration signal, including the first instruction and the second instruction, to gateway device 208 so as to reconfigure the first configurable feature, reconfigure the second reconfigurable feature, turn off and restart radio 314, turn off and restart radio 316, and turn off and restart radio 318.

In some embodiments, configuration program 324 includes additional instructions, that when executed by controller 320, enable client device 212 to start a timer; and generate a third instruction to configure a third configurable feature. In some of these embodiments, configuration program 324 includes additional instructions, that when executed by controller 320, enable client device 212 to start the timer based on the generation of the first instruction; and transmit the queued-configuration signal so as to further include the third instruction when the third instruction is generated prior to expiration of the timer.

Interface circuit 334 can include one or more connectors, such as RF connectors, or Ethernet connectors, and/or wireless communication circuitry, such as 5G circuitry and one or more antennas.

Radios 328, 330, and 332 may include a Wi-Fi WLAN interface radio transceiver that is operable to communicate with gateway device 208. Radios 328, 330, and 332 include one or more antennas and communicate wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Client device 212 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Display 326 may be any known device or system to display an image to the user.

Interface circuit 334 can include one or more connectors, such as RF connectors, or Ethernet connectors, and/or wireless communication circuitry, such as 5G circuitry and one or more antennas.

Returning to FIG. 1, when controller 320 of client device 212 executes instructions within configuration program 324 to change the network configuration settings (S104). For example, assume for purpose of the discussion that resident 206 wants to change the service set identifier (SSID) of a wireless network provided by gateway device 208 by way of radio 314. Resident 206 may change the SSID through configuration program 324, and it may store this information into memory 322. This will be described in greater detail with reference to FIG. 4.

Figure 4:
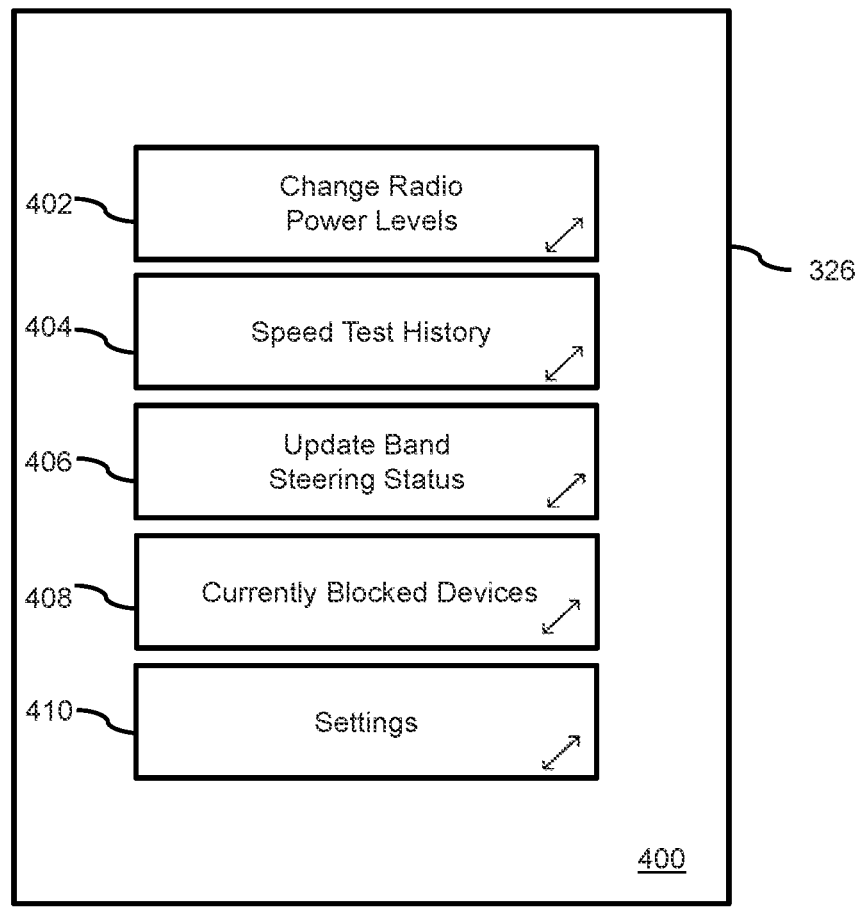
FIG. 4 illustrates a graphic user interface (GUI)

FIG. 4 illustrates a non-limiting example of a GUI 400 in accordance with aspects of the present disclosure.

As shown in the figure, GUI 400 may include a plurality of icons, a sample of which are illustrated as icons 402, 404, 406, 408, and 410, all of which are shown on display 326 of client device 212.

Returning to FIG. 1, assume that resident 206 would additionally like to change the broadcast power levels of radio 314, radio 316 and radio 318 on gateway device 208. As shown in FIG. 4, using client device 212, resident 206 would select icon 402, which may be shown on display 326. Other non-limiting examples of possible network configuration setting changes may include enabling/disabling tri-band/dual-band status, stopping the broadcasting of onboarding Wi-Fi network, configuring properties of the front haul/guest network, etc.

Returning to FIG. 1, after the user sets first network configuration setting (S104), a restart period window begins (S106). For example, once resident 206 changes the radio power levels, a restart period window may start. A non-limiting example of this restart period window is 5 seconds.

Returning to FIG. 1, after the restart period window begins (S106), the network configuration request is added to queue maintained by the client device (S108). For example, once the 5 second restart period window begins, the request to change the radio power levels may be added to a queue maintained in configuration program 324.

As previously stated, changing any network configuration settings may cause gateway device 208 to restart. The purpose of the restart window period is to allow an ample amount of time for resident 206 to make all of the network configuration changes at one time, thereby creating a queue of network configuration settings, to prevent repeated disconnections from the wireless network. The network configuration queue may hold all of these changes made to gateway device 208. As shown in FIG. 3, controller 320 may execute instructions in configuration program 324 to store the network configuration queue in memory 322.

Returning to FIG. 1, after the network configuration request is added to a queue maintained by the client device (S108), the client device listens for next network configuration request (S110). For example, as shown in FIG. 3, after resident 206 inputs directions to change radio power levels, the network configuration queue may remain open. Controller 320 may execute instructions in configuration program 324 to wait to see if resident 206 requests any further changes to gateway device 208. This will prevent multiple gateway device 208 resets, one for each distinct configuration setting, and will alternatively provide a single reset of gateway device 208 for all the configuration setting made during the time period of the set timer. This optimizes the wireless network for connected client devices, as there may be less restarts, which in turn may mean less time disconnected from the wireless network.

Returning to FIG. 1, after the client device listens for next network configuration request (S110), it is determined whether the client device receives another network configuration setting from the user (S112). For example, as shown in FIG. 3, controller 320 executes instructions in configuration program 324 to determine whether resident 206 requested any further changes to gateway device 208.

Returning to FIG. 1, if the client device received the next network configuration setting from the user (Yes at S112), then the restart window timer is reset (S114). For example, as shown in FIG. 4, consider the situation that resident 206 also requested to update band steering status by selecting icon 406. As shown in FIG. 3, controller 320 would execute instructions in configuration program 324 so as to place this request in the network configuration queue in memory 322 along with the previous request to changes to radio power levels. After making another network configuration change, the restart window timer may be reset in case of other network configuration requests by resident 206. This allows for additional requests by the user to be put into the network configuration queue before gateway device 208 is reset.

Returning to FIG. 1, after the restart window timer is reset (S114), then the restart period window may once again begin (return to S106). If it is determined that the client device did not receive the next network configuration setting from the user (No at S112), it is then determined whether the restart period window has expired (S116). For example, assume that the only network configuration request that resident 206 had made was to change the radio power levels. As shown in FIG. 3, controller 320 may execute instructions in configuration program 324 to cause controller to again determine whether the restart period window has expired.

Returning to FIG. 1, if it is determined that the restart period window has not expired (No at S116), then the client device may again listen for further network configuration requests (Return to S110). For example, if resident 206 has only requested to change radio power levels, configuration program 324 may check if the restart period window has expired. If it has not, then configuration program may continue to wait for resident 206 to input more network configuration requests.

If it is determined that the restart period window has expired (Yes at S116), then the queued request is sent to the gateway device (S118). For example, after resident 206 has input all of their network configuration requests to configuration program 324, then queued-configuration signal 220 may be sent to gateway device 208. As shown in FIG. 3, controller 320 may execute instructions in configuration program 324 to cause controller 320 to retrieve the list of queued configurations, generate queued-configuration signal 220 and instruct one of radio 328, radio 330 or radio 332 to transmit queued-configuration signal 220 to a corresponding one of radio 314, radio 316 or radio 318 of gateway device 208. As to which radio will transmit queued-configuration signal 220, it will be the radio for which client device 212 is currently associated with gateway device 208.

This process allows the user to make as many network configuration changes as they would like at one time. Resident 206 may have made one change, or they may have made several changes. No matter how many changes they have made, queued-configuration signal 220 is sent to gateway device 208, where the changes may all be made at one time, allowing for a single restart of gateway device 208. This is more beneficial to users connected to the wireless network, as they only are disconnected for a brief period of time, rather than multiple periods of time.

Returning to FIG. 1, after the queued request is sent to the gateway device (S118), the network configuration request is processed and the Wi-Fi driver is restarted (S120). For example, assume that resident 206 has made two network configuration changes using configuration program 324 of client device 212. As shown in FIG. 3, controller 308 of gateway device 208 will receive queued-configuration signal from the receiving radio. Based on the queued-configuration signal, controller 308 will execute instructions within configuration program 312 to cause controller to restart the Wi-Fi driver of gateway device 208. Controller 308 may then process the changes delineated within the queued-configuration signal. Even though resident 206 had made two changes to the network configuration settings, gateway 208 may only be restarted once. This equates to only one moment of wireless disconnection for the connected client devices.

Returning to FIG. 1, once the network configuration request is processed and the Wi-Fi driver is restarted (S120), the user is informed of the Wi-Fi disconnection (S122). For example, as shown in FIG. 3, once the Wi-Fi driver is restarted, client device 212 may receive a notice on display 326 alerting resident 206 of the Wi-Fi disconnection due to the network configuration request. This lets resident 206 know that the changes were successfully made, and that a short immediate Wi-Fi disconnection will result from implementation of the changes to gateway device 208.

Returning to FIG. 1, after the user is informed of Wi-Fi disconnection (S122), algorithm 100 ends (S124).

In the above embodiment, configuration program 324 is based on the screen event-based network configuration setting queuing algorithm, wherein the user selects certain configurations that would each, otherwise if taken alone, cause gateway device 208 to restart. However, in other embodiments, the user may select an event that itself may include a plurality of configurations that would each, otherwise if taken alone, cause gateway device 208 to restart. This type of background flow-event based network configuration setting queuing algorithm in accordance with aspects of the present disclosure will be described in greater detail with reference to FIG. 5.

Figure 5:
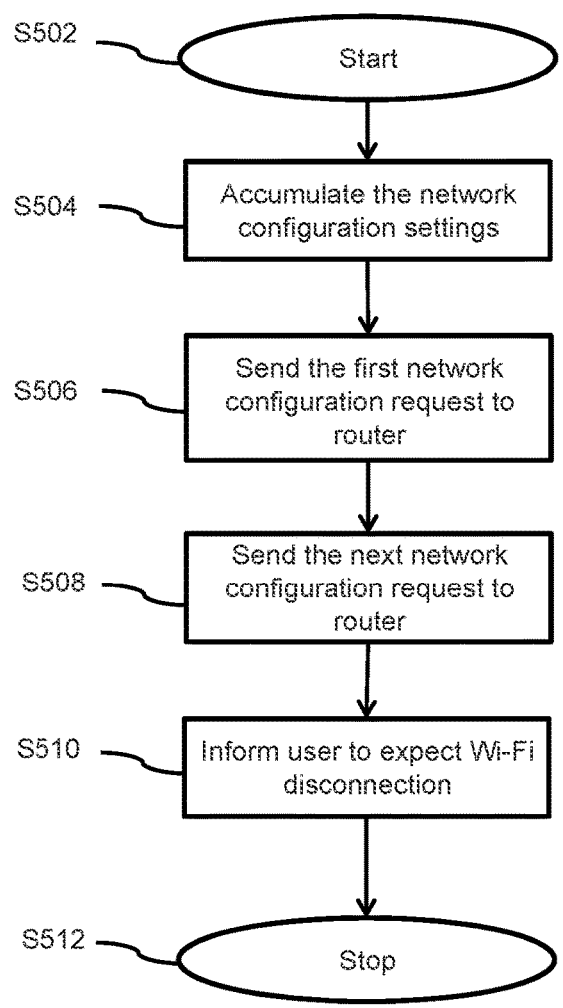
FIG. 5 illustrates an algorithm for a background flow event-based network configuration settings queuing system.

FIG. 5 illustrates an algorithm 500 for background flow event-based network configuration settings queuing system.

As shown in FIG. 5, algorithm 500 starts (S502), and the network configuration settings are accumulated (S504). For example, suppose for purposes of discussion that resident 206 wanted to stop the broadcasting of an onboarding Wi-Fi network and enable triband status. In such a case, they would select this option on GUI 400 (not shown). Further, for purposes of discussion, this selected procedure is actually a combination of one procedure to stop the broadcasting of an onboarding Wi-Fi network, which would by itself otherwise cause gateway device 208 to restart, and one procedure to enable triband status, which would by itself otherwise also cause gateway device 208 to restart. Therefore, in accordance with aspects of the present disclosure, as shown in FIG. 3, controller 320 would execute instructions in configuration program 324 to cause these two separate network configuration setting to be accumulated in a manner similar to the queued configuration procedure discussed above with reference to FIG. 1.

Returning to FIG. 5, after the network configuration settings are accumulated (S504), the first network configuration request is sent to the gateway device (S506). For example, after resident 206 selected the option to stop the broadcasting of onboarding Wi-Fi network and enable triband status, a single request would be sent to gateway device 208 listing the accumulated configurations in sequential order.

As shown in FIG. 3, controller 320 may execute instructions in configuration program 324 to cause controller 320 to retrieve the accumulated configurations, generate queued-configuration signal 220 and instruct one of radio 328, radio 330 or radio 332 to transmit queued-configuration signal 220 to a corresponding one of radio 314, radio 316 or radio 318 of gateway device 208. As to which radio will transmit queued-configuration signal 220, it will be the radio for which client device 212 is currently associated with gateway device 208.

Returning to FIG. 5, after the first network configuration request is sent to the gateway device (S506), the next network configuration request is sent to the gateway device (S508). Referring to the example above, gateway device 208 would be sent the first instruction to complete the request of resident 206. Then, gateway 208 would be sent the second instruction.

Although resident 206 is selecting a single option on GUI 400, there are multiple steps that need to be taken so that their request is fulfilled. Resident 206 does not need to be informed of all of the extra steps that need to be completed to fulfill their request. Configuration program 324 knows when to send these extra steps, and may send a single request, as an accumulation of a plurality of individual configurations, to gateway device 208 to be completed for resident 206 so that their request is fulfilled without having multiple Wi-Fi driver restarts.

Returning to FIG. 5, after the next network configuration request is sent to the router (S508), the user is informed of the impending Wi-Fi disconnection (S510). Similar to the example provided for screen event-based network configuration settings queuing algorithm, once the Wi-Fi driver is restarted, client device 212 may receive a notice on display 326 alerting resident 206 of the Wi-Fi disconnection due to the network configuration request. This lets resident 206 know that the changes were successfully made, and that the Wi-Fi disconnection is a result of the changes.

Returning to FIG. 5, after the user is informed of the impending Wi-Fi disconnection (S510), algorithm 500 ends (S512).

When changing network configuration settings, the Wi-Fi driver must be restarted to make these changes. This can be troublesome to users when they would like to make multiple network configuration changes. These changes may restart the Wi-Fi driver, and it may affect the 3 radios of the router, being 2.4 GHz, low 5 GHz, and high 5 GHz. This creates a poor user experience, as they may have repeated wireless network interruptions.

In accordance with the present disclosure, when the router has changes made to its network configuration settings, it may not immediately restart. Instead, the router may wait a short period of time to restart the Wi-Fi drivers after applying these network configuration settings. The client device may queue all network configuration setting requests made by the user, and send all of these requests at one time. This allows for a single Wi-Fi driver restart, as opposed to restarting the Wi-Fi driver every time the user makes a change to a single network configuration setting. The client device may queue the network configuration requests in two ways: screen event-based queuing and background flow-event queuing. Screen event-based queuing may continue to restart the Wi-Fi driver restart timer so long as the user is inputting new requests into the client device. When the user stops making network configuration changes, the queued network configuration requests are sent to the router in sequential order. The router may make these changes, and then initiate the Wi-Fi driver restart. Background flow-event queuing may send essential background steps to the router without the user's knowledge. The client device may determine these background configuration settings, arrange them in such a way that the flow of the user's changes is unaffected, and then send those requests to the router in a sequential manner.

Thus, the present disclosure as disclosed optimizes Wi-Fi driver restarts when changing network configuration settings. Rather than restarting the Wi-Fi driver multiple times, and in turn disrupting the wireless network multiple times, the present disclosure may change multiple network configuration settings while only restarting the Wi-Fi driver one time.

The operations disclosed herein may constitute algorithms that can be effected by software, applications (apps, or mobile apps), or computer programs. The software, applications, or computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A client device for use with a router having a radio, a first configurable feature, a second configurable feature, and a third configurable feature, said client device comprising:
   a memory; and
   a processor configured to execute instructions stored on said memory to cause said client device to:
   generate a first instruction to configure the first configurable feature;
   generate a second instruction to configure the second configurable feature;
   start a timer;
   generate a third instruction to configure the third configurable feature; and
   transmit a queued-configuration signal, including the first instruction, the second instruction, and the third instruction, to the router so as to reconfigure the first configurable feature, reconfigure the second reconfigurable feature, reconfigure the third reconfigurable feature, and turn off and restart the radio.

2. The client device of claim 1, wherein
the timer is started based on the generation of the first instruction.

3. The client device of claim 2, wherein said processor is configured to execute instructions stored on said memory to cause said client device further to:
restart the timer based on the generation of the second instruction; and
wherein the third instruction is generated prior to expiration of the restarted timer.

4. The client device of claim 1, wherein the router additionally has a second radio, and wherein said processor is configured to execute instructions stored on said memory to cause said client device further to transmit the queued-configuration signal to the router so as to additionally turn off and restart the second radio.

5. The client device of claim 1, wherein said processor is configured to execute instructions stored on said memory to cause said client device further to transmit the queued-configuration signal to the router so as to turn off and restart the radio a single time after reconfiguring the first configurable feature and reconfiguring the second reconfigurable feature.

6. The client device of claim 1, wherein said processor is configured to execute instructions stored on said memory to cause said client device further to:
select an event that includes a first change to a first configuration and a second change to a second configuration; and
generate the first instruction and generate the second instruction based on the selection of the event.

7. A method of using a client device with a router having a radio, a first configurable feature, a second configurable feature, and a third configurable feature, said method comprising:
generating, via a processor configured to execute instructions stored on a memory, a first instruction to configure the first configurable feature;
generating, via the processor, a second instruction to configure the second configurable feature;
starting a timer;
generating a third instruction to configure the third configurable feature; and
transmitting, via the processor, a queued-configuration signal, including the first instruction, the second instruction, and the third instruction, to the router so as to reconfigure the first configurable feature, reconfigure the second reconfigurable feature, reconfigure the third reconfigurable feature, and turn off and restart the radio.

8. The method of claim 7, wherein:
the timer is started based on the generation of the first instruction.

9. The method of claim 8, further comprising:
restarting the timer based on the generation of the second instruction; and
wherein the third instruction is generated prior to expiration of the restarted timer.

10. The method of claim 7,
wherein the router additionally has a second radio, and
wherein said transmitting comprises transmitting, via the processor, the queued-configuration signal so as to additionally turn off and restart the second radio.

11. The method of claim 7, wherein said transmitting comprises transmitting, via the processor, the queued-configuration signal so as to turn off and restart the radio a single time after reconfiguring the first configurable feature and reconfiguring the second reconfigurable feature.

12. The method of claim 7, further comprising:
selecting, via the processor, an event that includes a first change to a first configuration and a second change to a second configuration,
wherein said generating the first instruction and said generating the second instruction is based on the selection of the event.

13. A non-transitory, computer-readable media having computer-readable instructions stored thereon, the computer-readable instructions being capable of being read by a client device with a router having a radio, a first configurable feature, a second configurable feature, and a third configurable feature, wherein the computer-readable instructions are capable of instructing the client device to perform the method comprising:
generating, via a processor configured to execute instructions stored on a memory, a first instruction to configure the first configurable feature;
generating, via the processor, a second instruction to configure the second configurable feature;
start a timer;
generate a third instruction to configure the third configurable feature; and
transmitting, via the processor, a queued-configuration signal, including the first instruction and the second instruction, and the third instruction, to the router so as to reconfigure the first configurable feature, reconfigure the second reconfigurable feature, the third reconfigurable feature, and turn off and restart the radio.

14. The non-transitory, computer-readable media of claim 13, wherein
the timer is started based on the generation of the first instruction.

15. The non-transitory, computer-readable media of claim 14, wherein the computer-readable instructions are capable of instructing the client device to perform the method further comprising:
restarting the timer based on the generation of the second instruction; and
wherein the third instruction is generated prior to expiration of the restarted timer.

16. The non-transitory, computer-readable media of claim 13, wherein the computer-readable instructions are capable of instructing the client device to perform the method
wherein the router additionally has a second radio, and
wherein said transmitting comprises transmitting, via the processor, the queued-configuration signal so as to additionally turn off and restart the second radio.

17. The non-transitory, computer-readable media of claim 13, wherein the computer-readable instructions are capable of instructing the client device to perform the method such that said transmitting comprises transmitting, via the processor, the queued-configuration signal so as to turn off and restart the radio a single time after reconfiguring the first configurable feature and reconfiguring the second reconfigurable feature.

18. The non-transitory, computer-readable media of claim 13, wherein the computer-readable instructions are capable of instructing the client device to perform the method further comprising:

selecting, via the processor, an event that includes a first change to a first configuration and a second change to a second configuration,
wherein said generating the first instruction and said generating the second instruction is based on the selection of the event.

\* \* \* \* \*